(12) United States Patent
Fratini et al.

(10) Patent No.: US 6,176,639 B1
(45) Date of Patent: Jan. 23, 2001

(54) FIXING DEVICE

(75) Inventors: Heinz-Willi Fratini, Lohmar; Manfred Leufgen, Niederzier, both of (DE)

(73) Assignee: Numatics GmbH, Sankt Augustin (DE)

( * ) Notice: Under 35 U.S.C. 154(b), the term of this patent shall be extended for 0 days.

(21) Appl. No.: 09/187,648

(22) Filed: Nov. 6, 1998

(30) Foreign Application Priority Data

Nov. 8, 1997 (DE) ............................................. 197 49 477

(51) Int. Cl.$^7$ ....................................................... F16B 2/18
(52) U.S. Cl. ........................ 403/322.1; 403/104; 188/67
(58) Field of Search ............................... 403/322.1, 321, 403/109.1, 110, 104, 409.1, 377; 188/67; 297/375, 374

(56) References Cited

U.S. PATENT DOCUMENTS

| | | | |
|---|---|---|---|
| 2,227,397 | * 12/1940 | Lucker | ................................. 188/67 X |
| 2,363,228 | * 11/1944 | Cade | ................................. 403/104 X |
| 2,806,723 | 9/1957 | Fairclough . | |
| 3,828,893 | * 8/1974 | Clark | ...................................... 188/67 |
| 3,893,730 | * 7/1975 | Homier et al. | ..................... 403/104 X |
| 4,191,503 | * 3/1980 | Neff et al. | ........................... 188/67 X |
| 4,387,926 | * 6/1983 | Van Eerden et al. | .............. 188/67 X |
| 4,469,289 | 9/1984 | Gebo . | |
| 4,938,319 | * 7/1990 | Ernst | ....................................... 188/67 |
| 5,131,115 | * 7/1992 | Sarto | .................................... 188/67 X |
| 5,595,410 | 1/1997 | Wilson et al. . | |
| 5,823,300 | * 10/1998 | Higuchi | ................................... 188/67 |

FOREIGN PATENT DOCUMENTS

| | | |
|---|---|---|
| 0 452 702 B1 | 2/1995 | (EP) . |
| 1242322 | 8/1971 | (GB) . |
| 2 012 856 | 8/1979 | (GB) . |

* cited by examiner

*Primary Examiner*—Harry C. Kim
(74) *Attorney, Agent, or Firm*—Harness, Dickey & Pierce, P.L.C.

(57) ABSTRACT

A fixing device, for fixing a linearly displaceable machine part relative to a fixedly supported machine part, has a guiding block (11), a bar member passing through the guiding block (11) in a bar guiding mechanism (14). The guiding block (11) has a controllable setting device and clamping members (21) which are provided with through-holes (24) for the bar member. The clamping members (21) in the guiding block (11) are settable by the setting device, between a first position in which the members (21) clamp the bar member and a second position in which the members (21) release the bar member. The clamping members (21) constitute a plurality of congruent plate elements (21) with parallel surfaces. In the release position, the plate elements (21) are located so as to be approximately normal relative to the central axis A1 of the bar guiding mechanism (14) and, in the clamping position, assume corresponding angular positions relative to the central axis A1 of the bar guiding mechanism (14).

15 Claims, 5 Drawing Sheets

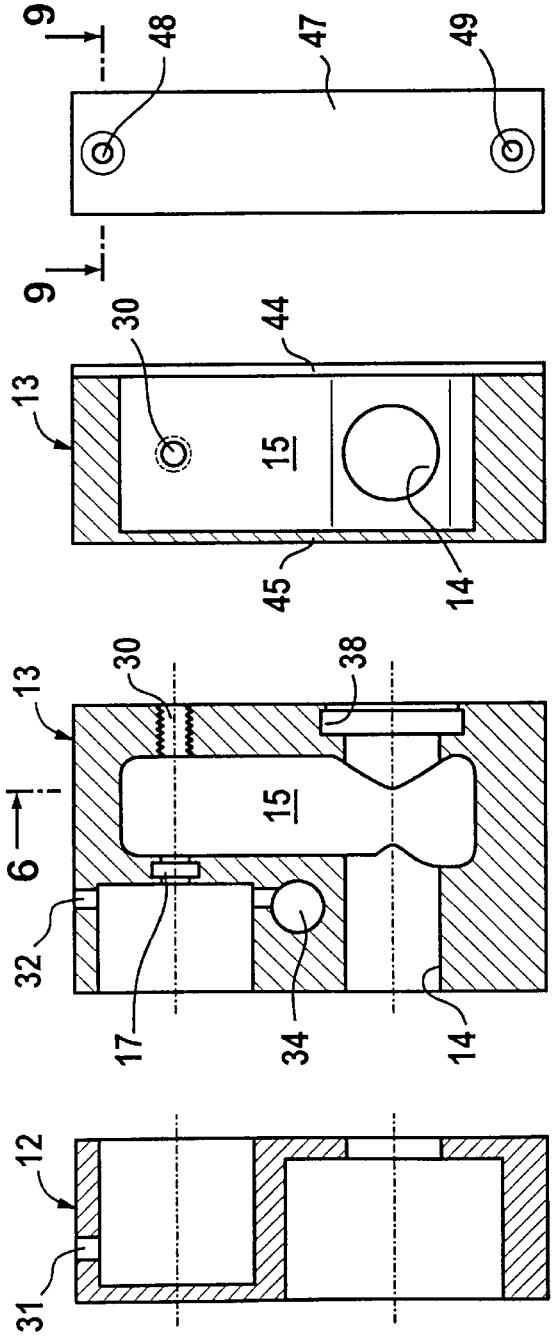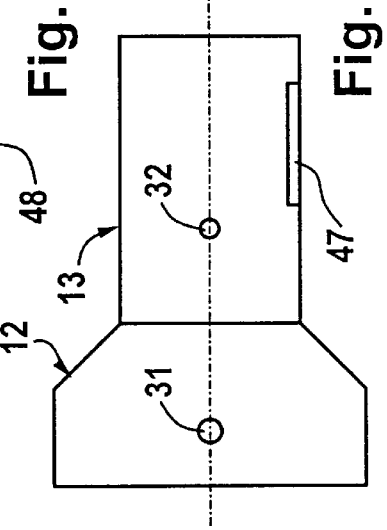

FIXING DEVICE

CROSS-REFERENCE TO RELATED APPLICATION

This application is based upon and claims priority to German Patent Application 197 49 477.3 filed Nov. 8, 1997, which is herein expressly incorporated by reference.

BACKGROUND OF THE INVENTION

The invention relates to a fixing device for fixing a linearly displaceable machine part relative to a fixedly supported machine part. One of the parts is provided in the form of a guiding block and the other one in the form of a bar member. The bar member passes through the guiding block in a bar guiding means. The guiding block has a controllable setting device and clamping members. The clamping members have through-holes which receive the bar member. The clamping members, in the guiding block, are settable by the setting device between a first and second position. In a first position, the clamping members clamp the bar member and in a second position, the clamping members, with play, release the bar member.

It is appreciated that, depending on the application, either the guiding block or the bar member can constitute the fixedly supported machine part. For example, if the fixing device is used in connection with pneumatic setting cylinders, the guiding block is firmly attached to the cylinder housing and constitutes the fixedly supported part. The bar member is formed directly by the piston rod of the setting cylinder. On the other hand, in linear guiding means of machine tools, it is the guiding bars which, as a rule, are fixedly arranged in a machine frame. The guiding block is connected to a carriage and thus constitutes the linearly driven part.

In the above applications, the fixing devices of the species do not comprise the bar member itself, but are only designed and prepared to receive a suitable bar member. They fulfill their function after the respective bar member has been added.

A fixing device is known from EP 0452 702 B1. A carriage, displaceable on guiding bars, and drivable by a piston rod can be fixed on the guiding bars. For this purpose, the device has two clamping members which are received in a cylindrical housing. The clamping members are provided in pairs and are symmetric relative to one another. In the region of their through-holes for the bar member, the clamping members are adapted to the cylindrical housing. The clamping members form semi-cylinders which are bored through approximately perpendicularly relative to the central axis.

On their substantially planar surfaces facing one another, the semi-cylinders have a symmetric wedge assembly which is loaded by an expanding pin. The pin is movable radially relative to the longitudinal axis of the guiding bar. Thus; the semi-cylinders are pivotable in opposite directions relative to the guiding bar. The expanding pin is inserted transversely into a setting piston which is guided in the cylindrical housing. As a result of the pivot movement, the clamping edges arranged opposite one another at an angle at the through-holes of the clamping members, come to rest on the bar member. As a result of which the latter, in a self-reinforcing way, the bar is axially clamped in. The pivot movement, which has a clamping effect, takes place under the influence of a compression spring acting on the setting piston. To release the bar member, with the help of the clamping members, the setting piston is loaded with a positive pressure force which overcomes the force of the compression spring.

As a result of the semi-cylindrical form of the clamping members, the respective outer clamping edges resting against the clamping member have a very disadvantageous shape. Accordingly, the carriage must be adapted to the setting direction, which extends radially relative to the guiding axis. This requires a disadvantageous spacious housing. As a result of the type of setting, the number of clamping members is limited to two. Due to the type of support provided for the clamping members, different holding forces are generated depending on the direction of load application. Thus, in each direction of load application, only one of the two clamping members builds up its highest possible holding force.

GB 2 012 856 A1 discloses a device with the piston rod of a hydraulic or pneumatic cylinder of the cylinder housing fixed by a locking device. The latter comprises either one single clamping member with a through-hole for the piston rod or a pair of clamping members. Each has a through-hole for the piston rod. The clamping members are supported outside the through-holes on one side in the cylinder housing. Further, the clamping members, while being loaded by a spring force, are tilted around one point of the supporting means. If a pair of clamping members are present, they are tilted in opposite directions. The single clamping member of one of the clamping members, as a function of the load on the piston rod, has a tendency to self-jam at the edges of the through-hole. Thus, to release the clamping member, it is necessary to apply positive force. This may result in a delay in the release of the piston rod.

U.S. Pat. No. 2,806,723 describes a telescopic support of variable length. An inner pipe is fixed in a sleeve inserted into an outer pipe. For this purpose, annular discs, with through-holes for the inner pipe, are inserted into the sleeve. The annular discs are supported at one point of their outer edge in the sleeve. The annular discs, in the opposite direction, are loaded by a compression spring in the sense of a tilting movement. The annular discs may form either a single, jointly supported and loaded group or two groups supported and loaded in opposite directions. In this case, too, one of the groups can jam when the supporting means is subjected to a load. Thus, it is necessary to apply positive mechanical forces in order to set the annular discs perpendicular relative to the sleeve to release the inner pipe.

SUMMARY OF THE INVENTION

It is therefore an object of the present invention to provide a fixing device which, while being of simple design, is able to build up high holding force values which are substantially independent of the direction of load application. At the same time, the risk of self-jamming under high axial loads is to be avoided. The objective is achieved by a fixing device with clamping members which are congruent plate elements with parallel surfaces. The clamping members, in a first position, assume corresponding angular positions relative to the central axis of the bar guiding means. The clamping members, in a second position, are located so as to be approximately normal relative to the central axis of the bar guiding means. The plate elements are supported by abutments. The abutments are positioned in a plane extending through the central axis of the bar guiding means. As a result of the planar parallel design and the synchronous setting of the clamping elements, the clamping elements can be provided in a number larger than two. Also, the clamping members can be actuated jointly by one single setting device. Due to the plate-like shape of the clamping elements, the through-holes are each delimited by two parallel circular edges. Thus, the clamping edges operating relative to the guiding bar have corresponding shapes which are symmetric relative to one another. In consequence, approximately identical pressure conditions are obtained at the two effective clamping edges of each clamping element. This avoids any point-like excessive wear or excessive plastic deformation at the clamping edges. In addition, the symmetric position of the clamping edges relative to the guiding bar leads to a high fixing force. The fixing force is independent of the direction of the load. The bar member is released by the clamping members with the setting device in a force-free position relative to the clamping members. The plate elements, in their entirety, are held in a substantially play-free way between a pair of abutments positioned in parallel opposite one another.

The setting device is in the form of a linear setting means. The operating axis of the linear setting means extends parallel to the central axis of the bar guiding means. The plane of the abutment is positioned perpendicular relative to a plane which extends through the central axis of the bar guiding means and the operating axis of the setting device. When loaded by the setting device, the plate elements tilt around axes of rotation which intersect the central axis of the bar guiding means. In consequence, in the case of short setting distances, both clamping edges positioned opposite one another diagonally relative to the center of the through-hole establish simultaneous contact. This results in an advantageous short reaction time of the setting device. In addition, support provided for the plate elements result in completely identical holding forces in both directions of load application. Thus, the device is particularly suitable for use with double-acting setting cylinders. Any wear at the plate elements, especially at the clamping edges, can easily be compensated for by a somewhat longer setting path of the setting device without the holding forces being reduced by wear.

An increase in the number of plate elements leads to a reduction in the edge load on the individual elements. The increase is advantageous with respect to wear and deformation symptoms at the clamping edges. However, for practical reasons, the number of plate elements should not exceed six.

With predetermined setting forces and lever arms, a reduction in the thickness of the plate elements results in an increase in the holding forces. The reduction in thickness is limited only by the need to take into account the strength of the plate elements.

A compact design is achievable due to the central axis of the bar guiding means and the operating axis of the setting device extending parallel relative to one another.

The setting device can be provided in the form of a pneumatic setting cylinder with a setting piston which is loaded by a pre-tensioned compression spring. If the setting cylinder is pressureless, the compression spring pushes the setting piston into a first position. As a result, the compression spring is partially untensioned. If the setting cylinder is pressure-loaded, the setting piston reaches a second position. Here, the compression spring is compressed by the setting piston. Preferably, the setting device is switched to a pressureless position when the guiding bar is in a clamped position. In this way, for safety reasons, the guiding bar is automatically fixed in case an unintended loss of pressure occurs in the air pressure supply line. Unblocking can be effected, for example, by manually setting the setting piston against the force of the compression spring. The setting cylinder may be integrated into the guiding block. If high holding forces are required for the guiding bar, the setting device may be used to clamp the guiding bar when the setting cylinder is pressure-loaded. Unblocking is then effected in a pressure-less way with the help of the compression spring acting in the opposite direction. If, during the blocking process, high holding forces are required on the guiding bar and if, during unblocking, short setting times are particularly important, it is possible to use a double-acting pneumatic setting cylinder.

To ensure adequate lubrication and/or a suitable surface quality, the surfaces of adjoining plate elements directly contact one another. A suitable plate material for this application is bronze CuSn6Zn according to DIN 17662, for example. To ensure functioning even without any lubrication, sliding plates with friction-reducing surfaces, for example, Teflon plates, can be inserted between each two plate elements. The sliding plates do not participate in the clamping function relative to the guiding bar. However, normally, such a measure is not necessary.

As a rule, the bar guiding means is designed for a round bar member. The through-holes in the plate elements are circular holes. In particular, this is the case if existing guiding bars or piston rods are to be provided directly with the clamping device.

However, it is also possible for the bar guiding means to be designed for a multi-edged bar member. A four-edged bar member may be used with the through-holes in the plate elements being adapted to the cross-section of the bar guiding means. In such a case, in contrast to circular cylindrical guiding bars, it is possible to achieve uniform load conditions along the clamping edges.

Independently of the shape of the guiding bar, it is necessary to allow a running-in and adaption phase at the clamping edges. The setting path may give slightly during the running-in stage.

The plate elements are preferably provided with anti-rotation means relative to the guiding bar. Congruent bores are formed in the plate elements, and a guiding journal is guided through these bores. The journal extends parallel to the central axes of the bar guiding means. The guiding journal can be provided in the form of a piston rod of a setting piston of the setting device. An axial stop is provided on the piston rod for a first plate element. The stop is in the form of a step of the piston rod. Alternatively, it is possible to provide anti-rotation means where the plate elements are closely guided laterally in the guiding block.

The plate elements are preferably oblong and rectangular. Centrally, at one longitudinal end, the plates have a through-hole for the guiding bar. Optionally, at the other longitudinal end, the plates have a bore for the guiding journal. The length of the plate elements determines the length of the lever arm of the setting device. The lever arm needs to be optimized in the available space with respect to the size of the setting device.

The abutments for the plate elements can be blade-shaped or prism-shaped and formed in one piece in a recess for receiving the plate elements in the guiding block. This keeps the number of parts in the guiding block small. Alternatively, the abutments can be bars inserted into bores and passing through the recess for the plate elements. This also constitutes a simple and cheap method of production.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the invention will be described below in greater detail with reference to the drawings, wherein:

FIG. 3 is a section view of a first holding part of the guiding block of a fixing device according to FIG. 1;

FIG. 4 is a plan view of the first housing part according to FIG. 3;

FIG. 5 is a section view of a second housing part of a guiding block of a fixing device according to FIG. 1;

FIG. 6 is a section view of the second housing part according to FIG. 5 along section line 6—6 thereof;

FIG. 7 is a plan view of the second housing part according to FIG. 5;

FIG. 8 is a plan view of a locking plate for the second housing part according to FIG. 5;

FIG. 9 is a cross-section view of the locking plate according to FIG. 8 along line 9—9 thereof;

FIG. 10 is a plan view of the inter-connected parts according to FIGS. 4, 7 and 9;

FIG. 12a is a view like FIG. 12 of a Teflon plate;

FIG. 12b is a view like FIG. 12 of another embodiment of the present invention;

FIG. 13a is a plan view of the plate of FIG. 12a;

FIG. 13b is a plan view of the plate of FIG. 12b;

DETAILED DESCRIPTION OF THE PREFERRED EMBODIMENT

Figure 1:
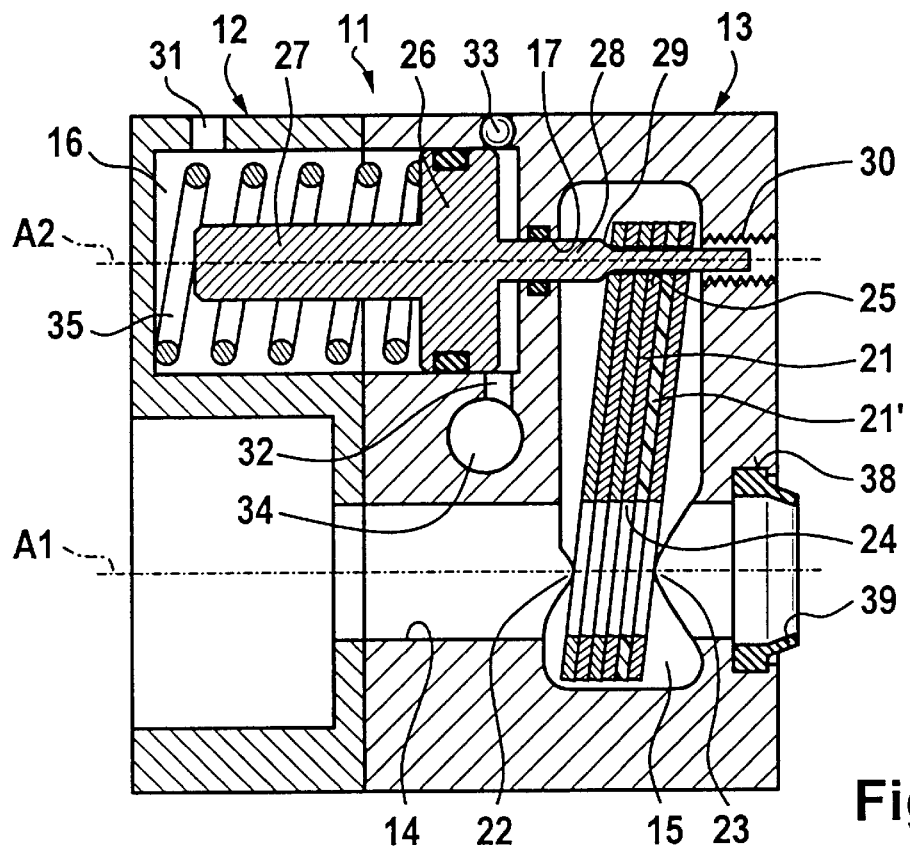
FIG. 1 is a cross-section view of an inventive fixing device in a guiding bar clamping position.
Figure 2:
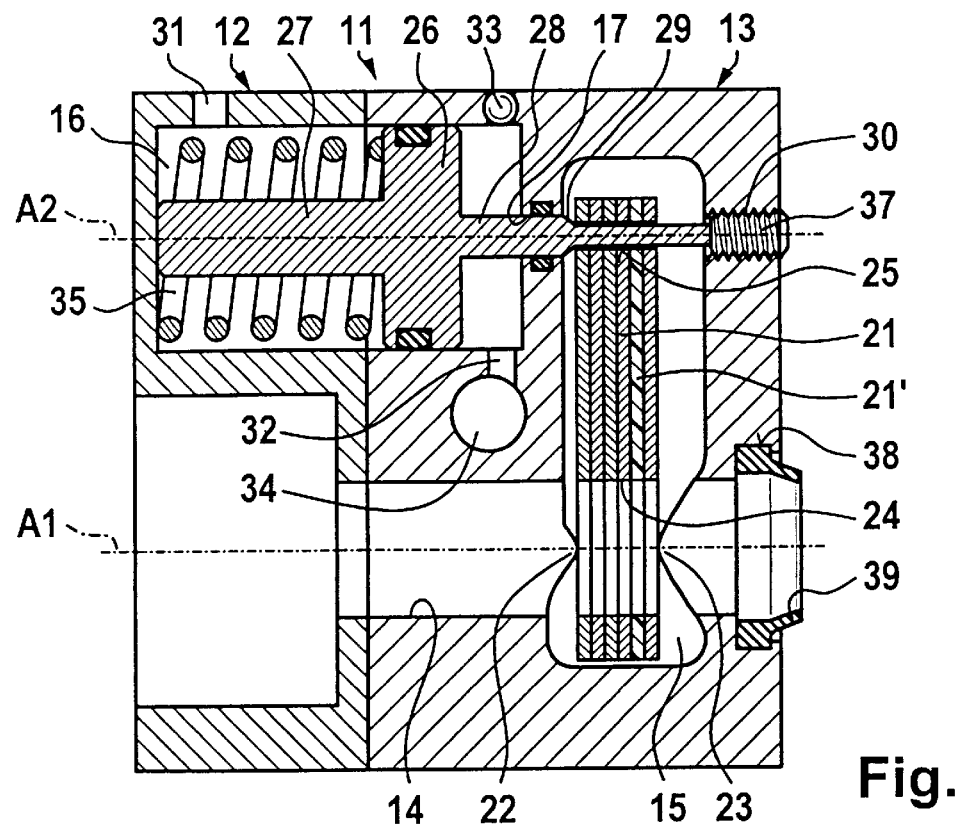
FIG. 2 is a view like FIG. 1 of the inventive fixing device in a guiding bar releasing position.

FIGS. 1 and 2 will be described jointly below.

An inventive fixing device comprises a guiding block 11 including a first housing part 12 and a second housing part 13. The housing parts 12, 13 are connected to one another in a planar way. The two housing parts, jointly, form cylindrical bar guiding means 14 with a guiding axis A1. A chamber 15 is formed in the housing part 13. The chamber 15 extends approximately transversely to the axis of the bar guiding means 14 and passes through same. Furthermore, the two housing parts form a cylindrical chamber 16 of a setting unit with an operating axis A2. The cylindrical chamber 16 comprises a co-axial passage 17 leading to the chamber 15. A plurality of six plate elements 21 are arranged in the chamber 15.

The plate elements 21 are held between two blade-shaped or prism-shaped abutments 22, 23. The blade-shaped abutments are positioned parallel relative to one another and extend in opposite directions. The abutments 22, 23 each perpendicularly intersect the guiding axis A1. The abutments 22, 23 are positioned in a plane which is located perpendicularly relative to the plane formed by the two axes A1 and A2.

The plate elements 21 have first congruent circular holes 24. The holes 24 receive a guiding bar. The holes 24 are arranged substantially concentrically relative to the axis A1. The plate elements 21 also include second similar circular holes 25. Holes 25 are arranged substantially concentrically relative to the axis A2 and serve to receive an actuating element.

A setting piston 26 is arranged in the chamber 16. A stop journal 27 is on the left of the piston and a piston extension 28 is on the right. The piston extension 28 is guided through the circular holes 25 of the plates 21. A stop step 29 is formed at the piston extension 28. The plate elements 21 rest against step 29. A ventilation bore 31 is in the housing part 12 left of the piston. An air pressure bore 32, in the second housing part 13, is provided to the right of the piston. An exit aperture of the air pressure bore 32 is closed by a ball 33. The air pressure bore 32 is closed by a ball 33. The air pressure bore 32 may be supplied with air pressure through a connecting bore 34. Furthermore, the cylindrical chamber 16 is provided with a pre-tensioned compression spring 35 which loads the piston 26.

In FIG. 1, the device is shown in a pressureless condition. As a result, the compression spring pushes the piston 26 and the piston extension 28 with the stop step 29, to the right. Accordingly, the upper ends of the plate elements 21, held between the abutments 22, 23, are displaced towards the right. The plate elements 21 are thus provided as a package relative to the guiding axis A1. Further, sliding or friction reducing plates 21' may be positioned between adjacent plates. This means that the axes of the circular holes 24 in the plate elements are also pivoted relative to the axis A1. Accordingly, the right-hand exit edges of the circular holes 24, positioned above the axis A1, and the left-hand exit edges of the circular holes 24, positioned below the axis A1, would clamp a guiding bar (not illustrated), without play, inserted into the bar guiding means 14.

FIG. 2 shows the device pressure-loaded at the connecting bore 34. The piston 26 is displaced towards the left against the pre-tensioned compression spring 35 until the stop journal 27 stops against the end of the cylindrical chamber 16. As a result, the piston extension 28, with the stop step 29, moves towards the left. This movement enables free movability of the plate elements 21 on the piston extension 28. The plate elements 21 are able to assume the illustrated position normally relative to the axis A1. Thus, the axes of the individual circular holes 24, in the plate elements 21, are coaxially aligned relative to the axis A1. Accordingly, the circular holes 24 have an excess dimension relative to the bar guiding means 14. Thus, the exit edges on both sides of the circular holes 24 would now release the guiding bar (not shown).

A threaded pin 37 is inserted into a bore 30 provided with a thread in FIG. 2. The pin 37 can push the piston 26 into the illustrated position if air pressure is unavailable at the supply bore 34. The annular groove 38 of the bar guiding means 14 is provided with a stripping element 39. The stripping element 39 prevents any dirt from entering at the bar guiding means.

FIGS. 3 and 4 which, below, will be described jointly, illustrate a detail on the housing part 12. Opposite a narrow connecting face 43, relative to the second housing part 13, the housing part 12, on the opposite face, has a widened connecting face 42. The connecting face 42 enables the housing part 12 to be securely bolted to a machine element such as a head piece of a pneumatic setting cylinder.

FIGS. 5 to 7 will be described jointly. FIGS. 5 to 7 illustrate the chamber 15 as a milled-out region of housing part 13. The chamber 15 is closed at one side by a housing wall 45. On the opposite side, a countersunk region 44 is present to attach a closing plate.

FIGS. 8 and 9 which, below, will be described jointly, show an associated closing plate 47. The closing plate 47 has two through-bores 48, 49. The closing plate 47 may be provided in the above-mentioned countersunk region 44.

Figure 11:
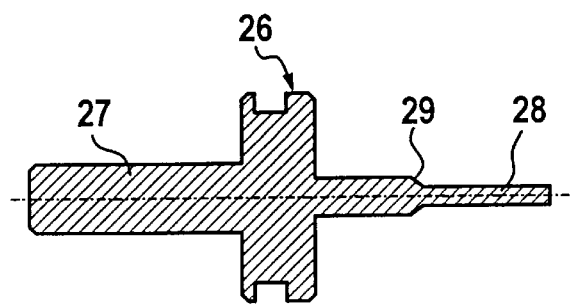
FIG. 11 is a detail section view of the setting piston of the fixing device according to FIG. 1.

FIG. 10 is a plan view of the inter-connected housing parts 12 and 13 with the closing plate 47. FIG. 11 is a cross-section view of the piston 26 with the stop journal 27 and the piston extension 28. The extension 28 also includes the stop step 29.

Figures 12, 13:
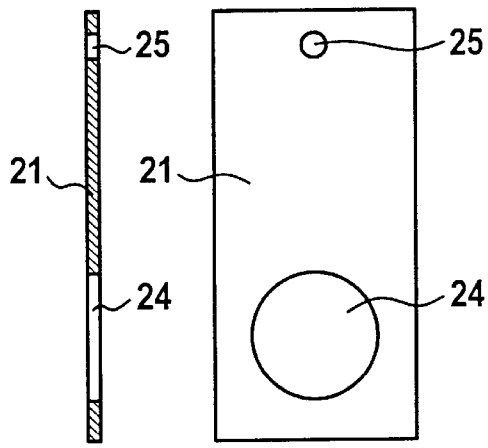
FIG. 12 is a section view of one of the plate elements of the fixing device according to FIG. 1.
FIG. 13 is a plan view of the plate element according to FIG. 12.

FIGS. 12 and 13 show a rectangular, oblong plate element 21. First circular hole 24 is at one end. The hole 24 is provided with play relative to a guiding bar. Second circular hole 25 is provided, with play, relative to the diameter of the piston extension 28, according to FIG. 11.

Figures 12A, 12B, 13A, 13B:
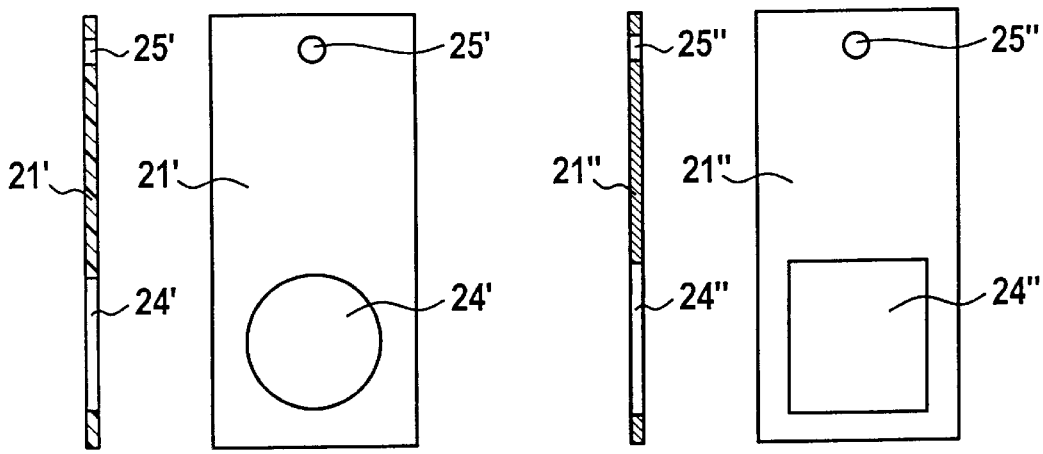

FIGS. 12a and 13a show the rectangular sliding or friction reducing plate 21'. The friction reducing plate 21' is preferably made from Teflon. The hole 24' is substantially larger than the hole of the plates 21. Also, the hole 25' is present to receive the piston extension.

FIGS. 12b and 13b illustrate a second embodiment of the oblong plate 21". Here, the first hole 24" has a rectangular cross-section. The second hole 25" is like that previously described.

Figure 16:
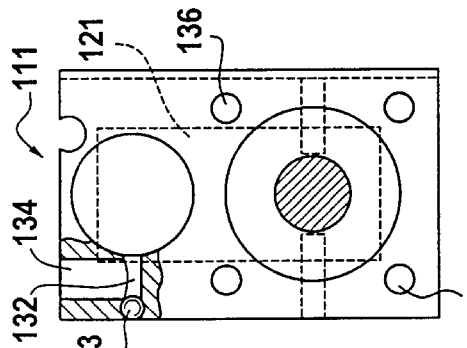
FIG. 16 is a partial section view of the fixing device according to FIG. 14.
Figure 14:
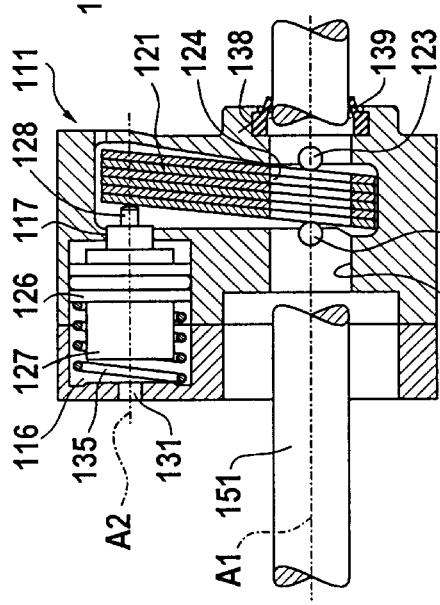
FIG. 14 is a section view of another embodiment of an inventive fixing device with a clamped-in guiding bar.
Figure 15:
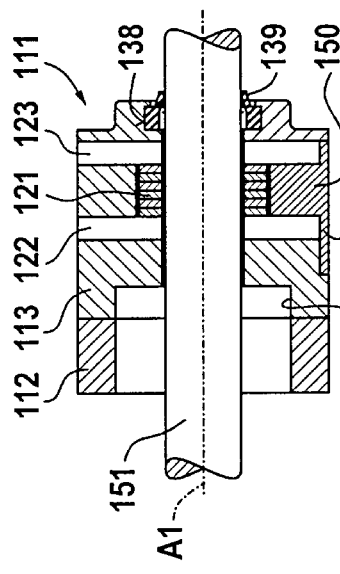
FIG. 15 is a section view of the fixing device according to FIG. 14 through the central axis of the bar guiding means.

FIGS. 14 to 18 will be described jointly below. The reference numbers of any details corresponding to those of the device according to FIGS. 1 to 13 will be increased by 100. Reference is being made to the above description, especially of FIGS. 1 and 2. FIGS. 14, 15 and 16 show the following deviations.

Figure 17:
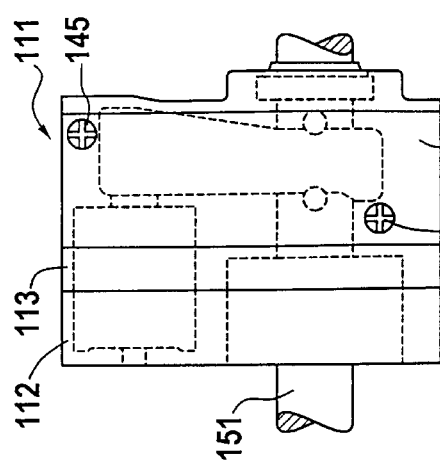
FIG. 17 is a side view of the fixing device according to FIG. 14.
Figure 18:
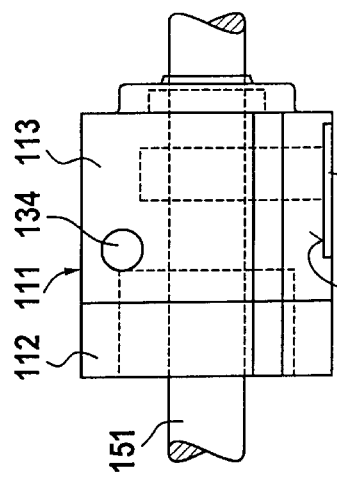
FIG. 18 is a plan view of the fixing device according to FIG. 14.

The closing plate 147 includes a projection 150 entering the chamber 115 to closely adapt the width of the chamber 115 to the plate elements 121. Thus, there is no need for any special anti-rotation means for the plate elements 121. The end of the piston extension 128 acts on the first plate element 121. The plate elements 121 only have circular holes 124. A guiding bar 151 passes through the circular holes 124. The guiding bar 151 is displaceable in the bar guiding means 114. The guiding bar 151, with the plate elements 121 in the position as best illustrated in FIG. 14, are clamped in the bar guiding means 114. The plate elements 121 are held by parallel abutments 122, 123. The abutments 122, 123 are bar material and are pressed into housing bores. Air pressure supply bores 134, 132 and a ventilation bore 131 are shown in modified positions relative to the setting cylinder 116. The cylinder 116 guides the setting position 126. Centering means 136 is inserted between the housing parts 112, 113. FIG. 17 shows the closing plate 147 bolted by two bolts 145, 146 to the housing part 113. FIG. 18 shows the position of the air pressure supply bore 134 in the housing part 113.

Figure 19:
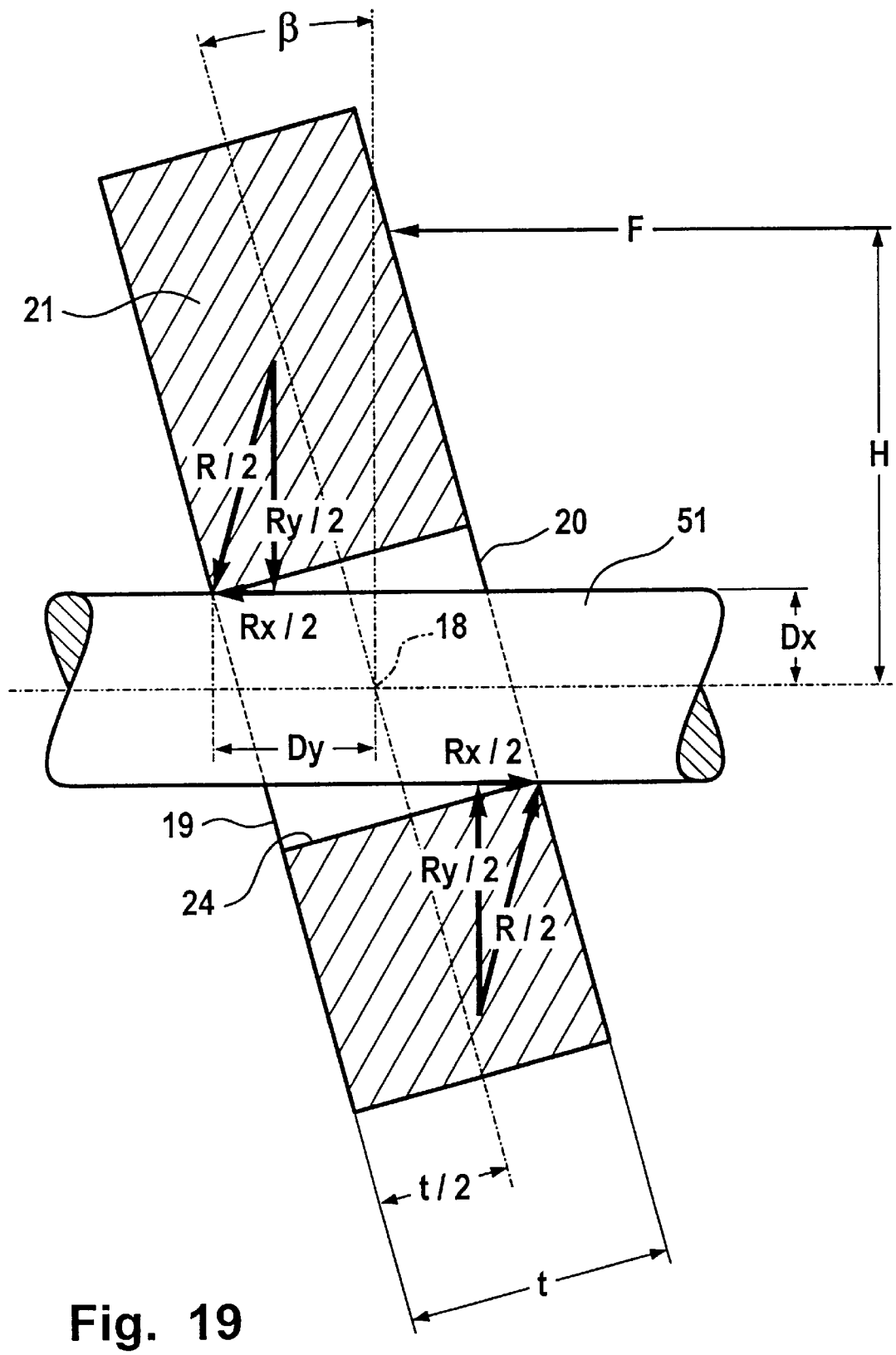
FIG. 19 is an enlarged section view of the basic design of a guiding bar with a plate element including the operating forces.

FIG. 19 shows a guiding bar 51 with the radius Dx and a plate element 21 which is pivoted by the angle β relative to the normal axis of the guiding bar 51. The plate element 21 has the thickness t. The pivot point 18 between the axis of the guiding bar 51 and the central plane of the plate 21 is defined by the symmetric contact of the exit edges 19, 20 of the circular hole 24 of the plate element 21 with the guiding bar 51. An actuating force F, by means of the lever arm H, acts on the plate element 21. The moment of the actuating force F and the moment of the clamping forces R/2 acting on the lever arm Dy at the plate element are balanced. The radial components Ry/2 of the clamping forces determine the friction forces axially acting on the guiding bar. The axial components Rx/2 which increase with an increasing angle β do not contribute to the friction forces.

The friction forces Bf are thus as follows:

$$B_f = R_y \cdot \mu$$
$$= R \cdot \cos\beta \cdot \mu$$
$$= \frac{2F \cdot H}{t} \cdot \cos\beta \cdot \mu$$

where $\mu$ is the coefficient of friction.
For small angles β there then applies with cos β=1

$$B_f = \frac{2F \cdot H}{t} \cdot \mu$$

which means that by reducing the plate thickness t, it is possible to increase the friction forces.

While the above detailed description describes the preferred embodiment of the present invention, the invention is susceptible to modification, variation and alteration without deviating from the scope and fair meaning of the subjoined claims.

What is claimed is:

1. A fixing device for fixing a linearly displaceable machine part relative to a fixedly supported machine part, comprising:

a guiding block adapted to receive a bar member passing through the guiding block through guiding means, said guiding means having a longitudinal central axis, said guiding block including a controllable setting device and clamping members, said setting device having longitudinal operating axis and said clamping members including through-holes for receiving the bar member, said clamping members, in the guiding block, being settable by the setting device, between a first position in which said clamping members clamp the bar member and a second position in which the clamping members release the bar member, the clamping members comprising:

a plurality of congruent plate elements with parallel surfaces in said first position, said plate elements assuming corresponding angular positions relative to the central axis of the bar guiding means and, in the second position, said plate elements being located so as to be approximately normal relative to the central axis of the bar guiding means and said plate elements being supported for moving between said angular positions by abutments which are positioned in a plane, comprising the central axis of the bar guiding means and lying perpendicularly to another plane being defined by said central axis and said operating axis.

2. A device according to claim 1, wherein said plate elements, in their entirety, are held in a substantially play-free way by means of line contact between a pair of said abutments positioned in parallel, opposite one another.

3. A device according to claim 1, wherein the setting device being a linear setting means whose operating axis extends parallel to the central axis of the bar guiding means.

4. A device according to claim 3, wherein said setting device being a pneumatic setting cylinder in the guiding block and having a setting piston loaded by a pretensioned compression spring.

5. A device according to claim 3, wherein the setting device being a doubly acting pneumatic setting cylinder provided in the guiding block.

6. A device according to claim 1, wherein surfaces of adjoining plate elements rest directly on one another.

7. A device according to claim 1, wherein between each two plate elements a sliding plate is inserted with a friction-reducing surface.

8. A device according to claim 1, wherein the bar guiding means are designed for a round bar member and that the through-holes in the plate elements are circular holes.

9. A device according to claim 1, wherein the bar guiding means are designed for a multiple-edged bar member and that the through-holes in the plate elements are adapted to the cross-section of the bar guiding means with play.

10. A device according to claim 1, wherein anti-rotation means are provided for the plate elements relative to the bar member.

11. A device according to claim 10, wherein the anti-rotation means are formed by congruent second bores in the plate elements and by a guiding journal guided through said bores and extending parallel to the central axis of the bar guiding means.

12. A device according to claim 11, wherein the guiding journal is provided in the form of a piston rod of a setting piston of the setting device.

13. A device according to claim 11, wherein the plate elements are oblong and rectangular and that they each, centrally, at one longitudinal end, comprise a through-hole for the guiding bar and at the other longitudinal end a bore for the guiding journal.

14. A device according to claim 1, wherein the abutments are provided in one piece and are especially blade-shaped or prism-shaped and positioned in a chamber in the guiding block for receiving the plate elements.

15. A device according to claim 1, wherein the abutments are provided in the form of bars of round material inserted into bores in the guiding block and passing through a chamber for receiving the plate elements.

* * * * *